US012749602B2

(12) United States Patent
Okamoto et al.

(10) Patent No.: US 12,749,602 B2
(45) Date of Patent: Sep. 29, 2026

(54) IRON-CHROMIUM-COBALT ALLOY MAGNET AND METHOD FOR PRODUCING SAME

(71) Applicant: Proterial, Ltd., Tokyo (JP)

(72) Inventors: Shinya Okamoto, Tokyo (JP); Atsuhiko Onuma, Tokyo (JP); Nobuyuki Okamura, Gunma (JP); Kousuke Kuwabara, Tokyo (JP); Shunya Adachi, Tokyo (JP); Masahiro Sato, Tokyo (JP); Takahiro Ishii, Gunma (JP)

(73) Assignee: Proterial, Ltd., Tokyo (JP)

( * ) Notice: Subject to any disclaimer, the term of this patent is extended or adjusted under 35 U.S.C. 154(b) by 444 days.

(21) Appl. No.: 18/276,245

(22) PCT Filed: Feb. 10, 2022

(86) PCT No.: PCT/JP2022/005363

§ 371 (c)(1),
(2) Date: Aug. 7, 2023

(87) PCT Pub. No.: WO2022/172995

PCT Pub. Date: Aug. 18, 2022

(65) Prior Publication Data

US 2024/0304365 A1 Sep. 12, 2024

(30) Foreign Application Priority Data

Feb. 10, 2021 (JP) ................................ 2021-019881

(51) Int. Cl.

| | |
|---|---|
| ***H01F 1/055*** | (2006.01) |
| ***B22F 9/08*** | (2006.01) |
| ***B22F 10/28*** | (2021.01) |
| ***B22F 10/64*** | (2021.01) |
| ***B33Y 10/00*** | (2015.01) |
| ***B33Y 40/20*** | (2020.01) |
| ***B33Y 80/00*** | (2015.01) |
| ***C22C 38/00*** | (2006.01) |
| ***C22C 38/02*** | (2006.01) |
| ***C22C 38/04*** | (2006.01) |
| ***C22C 38/06*** | (2006.01) |
| ***C22C 38/28*** | (2006.01) |
| ***C22C 38/30*** | (2006.01) |

(52) U.S. Cl.

CPC .............. *H01F 1/055* (2013.01); *B22F 9/082* (2013.01); *B22F 10/28* (2021.01); *B22F 10/64* (2021.01); *B33Y 10/00* (2014.12); *B33Y 40/20* (2020.01); *B33Y 80/00* (2014.12); *C22C 38/001* (2013.01); *C22C 38/002* (2013.01); *C22C 38/02* (2013.01); *C22C 38/04* (2013.01); *C22C 38/06* (2013.01); *C22C 38/28* (2013.01); *C22C 38/30* (2013.01); *B22F 2009/0824* (2013.01); *B22F 2304/10* (2013.01); *B22F 2998/10* (2013.01); *B22F 2999/00* (2013.01); *C22C 2202/02* (2013.01)

(58) Field of Classification Search

None

See application file for complete search history.

(56) References Cited

FOREIGN PATENT DOCUMENTS

| | | | |
|---|---|---|---|
| CN | 101298648 | | 11/2008 |
| JP | S5573854 | | 6/1980 |
| JP | S589827 | | 1/1983 |
| JP | S5394216 | * | 1/1983 |
| JP | 2005150355 | | 6/2005 |
| JP | 2021042456 | | 3/2021 |
| WO | 2017138191 | | 8/2017 |

OTHER PUBLICATIONS

"Office Action of China Counterpart Application", issued on Apr. 1, 2025, with English translation thereof, pp. 1-11.

"International Search Report (Form PCT/ISA/210) of PCT/JP2022/005363", mailed on Apr. 26, 2022, with English translation thereof, pp. 1-4.

* cited by examiner

*Primary Examiner* — Anthony M Liang

(74) *Attorney, Agent, or Firm* — JCIPRNET

(57) ABSTRACT

The purpose of the present invention is to provide: an iron-chromium-cobalt alloy magnet having improved magnetic characteristics, especially maximum energy product; and a method for producing the same. Provided is an iron-chromium-cobalt alloy magnet, wherein: the iron-chromium-cobalt alloy magnet includes titanium; the number density of Ti-enriched phases having a maximum diameter of 3 μm or greater in a cross-section is, on average, less than 1.0 per 10,000 $\mu m^2$; and the squareness ratio represented by (BH)max/(Br×HcB) exceeds 0.72.

7 Claims, 2 Drawing Sheets

Figure 1:
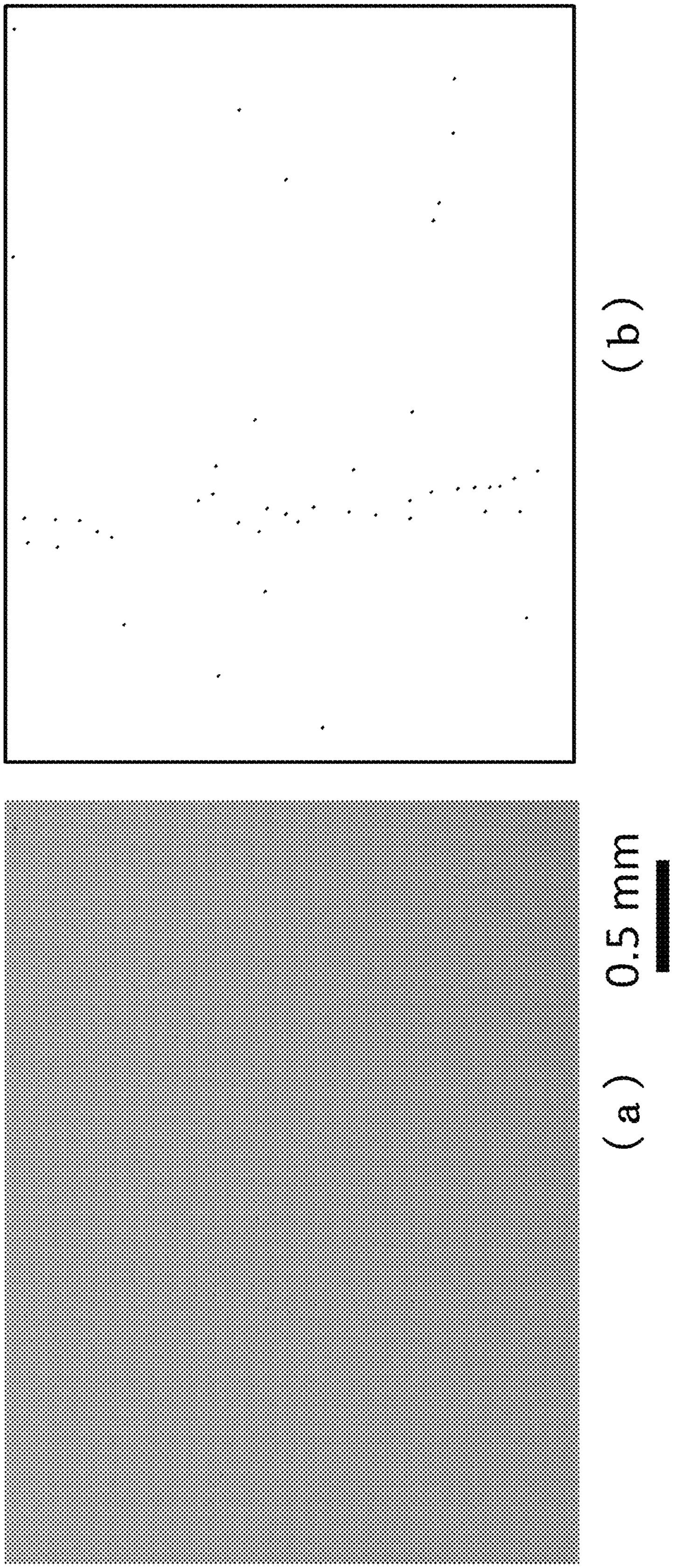

| | SEM IMAGE | EDS SURFACE ANALYSIS (Ti) | Ti CONCENTRATION |
|---|---|---|---|
| BUILT MAGNET (ADDITIVE-MANUFACURED MAGNET) |  |  | ENTIRE FIELD OF VIEW: 0.48 wt% |
| CAST MAGNET |  |  | ENTIRE FIELD OF VIEW: 1.07 wt%<br>#001 (PRECIPITATE): 87.88 wt%<br>#002 ( PART OTHER THAN PRECIPITATE ) : 0.14 wt% |

SEM IMAGE AND EDS SURFACE ANALYSIS IMAGE (Ti)

IRON-CHROMIUM-COBALT ALLOY MAGNET AND METHOD FOR PRODUCING SAME

CROSS-REFERENCE TO RELATED APPLICATION

This application is a 371 application of the International PCT application serial no. PCT/JP2022/005363, filed on Feb. 10, 2022, which claims the priority benefits of Japan Patent Application No. 2021-019881, filed on Feb. 10, 2021. The entirety of each of the above-mentioned patent applications is hereby incorporated by reference herein and made a part of this specification.

TECHNICAL FIELD

The present invention relates to an iron-chromium-cobalt alloy magnet that can improve magnetic characteristics and a method for producing the same.

BACKGROUND ART

Magnetic materials are divided into hard magnetic materials and soft magnetic materials. Among them, hard magnetic materials are magnetic materials that have a large coercive force and are unlikely to be demagnetized due to an external magnetic field, and representative examples thereof include ferrite magnets, NdFeB-based magnets, SmCo-based magnets, and metal magnets. Among these, metal magnets have advantages such as being suitable for mass production of relatively small and complicated shapes by adopting a production method according to sintering. Examples of metal magnets having such advantages include magnets mainly composed of three elements: iron, chromium and cobalt (hereinafter referred to as an iron-chromium-cobalt alloy magnet) and magnets mainly composed of iron, aluminum, nickel, and cobalt (hereinafter referred to as an alnico magnet).

Since iron-chromium-cobalt alloy magnets have a higher magnetic flux density and maximum energy product than alnico magnets, and they have excellent magnetic performance and also have a small cobalt content, it is possible to reduce price fluctuation risk. In addition, like alnico magnets, since iron-chromium-cobalt alloy magnets have a small temperature coefficient of the residual magnetic flux density, they have excellent temperature stability and also rare earth elements are not used in the raw materials, and thus there are advantages such as excellent procurement stability and ease of product application. Here, iron-chromium-cobalt alloy magnets are used in stepping motors, relays, torque limiters, magnetic sensors and the like.

Patent Literature 1 discloses an iron-chromium-cobalt-based magnet alloy containing 17 to 45% of Cr and 3 to 35% of Co (weight ratio), with the remainder Fe, and in which 0.1 to 5% of Si and 0.01 to 5% of Ti are added in combination. It is said that, since Ti has a strong affinity with N, in the iron-chromium-cobalt-based magnet alloy of Patent Literature 1 to which Ti is added, N that is mixed in from outside in the production procedure is fixed outside a matrix as TiN with Ti, and thus the influence of N can be removed without deteriorating magnetic characteristics, and it is possible to impart favorable magnetic characteristics by casting that cannot be obtained when Si alone is added.

Patent Literature 2 discloses a technique for obtaining an iron-chromium-cobalt permanent magnet by a spark plasma sintering method using an iron-chromium-cobalt alloy powder having an average particle size of 1.0 to 500 μm. The spark plasma sintering method is a method of applying an AC pulse current to a green compact of raw material powder component and performing sintering with the discharge that occurs in gaps between powder particles. Since the discharge between powder particles is used, a dense sintered body can be obtained in a short time without applying a high heat from the outside even if a hard-to-sinter material such as a metal or ceramic is used. It is said that, when the spark plasma sintering method is used to sinter an iron-chromium-cobalt alloy powder, a tendency of Ti to be enriched in the precipitation phase is mitigated, the Ti content in the parent phase increases, the crystal structure is stabilized, and thus magnetic characteristics of the iron-chromium-cobalt permanent magnet can be improved.

CITATION LIST

Patent Literature

[Patent Literature 1]
Japanese Patent Application Publication No. S 58-9827
[Patent Literature 2]
Japanese Unexamined Patent Application Publication No. 2005-150355

SUMMARY OF INVENTION

Technical Problem

In recent years, with higher demands for reducing the size of devices, increasing the output and increasing precision, and the like, iron-chromium-cobalt permanent magnets have been required to have better magnetic characteristics. Even with the iron-chromium-cobalt permanent magnet obtained by either technique of Patent Literature 1 or Patent Literature 2, it is difficult to sufficiently satisfy required magnetic characteristics.

Here, the present invention has been made in order to address problems in the related art, and an objective of the present invention is to provide an iron-chromium-cobalt alloy magnet that has improved magnetic characteristics, particularly a maximum energy product, and a method for producing the same.

Solution to Problem

The inventors of the present invention thought that, in order to address the above problems and improve magnetic characteristics, it was necessary to restrict formation of a precipitation phase containing titanium carbide and/or titanium nitride or reduce the size of the precipitation phase to reduce the influence of the precipitation phase as much as possible, and conducted extensive studies, and as a result, completed the present invention.

An iron-chromium-cobalt alloy magnet according to a first invention of the present application is an iron-chromium-cobalt alloy magnet, which contains titanium, and wherein the number density of Ti-enriched phases having a maximum diameter of 3 μm or more is, on average, less than 1.0 per 10,000 $\mu m^2$ in a cross section, and a squareness ratio represented by $(BH)_{max}/(B_r \times H_{cB})$ is more than 0.72.

In the first invention, the content of titanium is preferably 0.10 to 0.60% in terms of mass ratio.

In the first invention, a defect rate in a cross section is preferably 0.50% or less.

In the first invention, the defect rate is more preferably 0.05% or less.

In the first invention, the squareness ratio is preferably 0.80 or more.

In the first invention, the maximum energy product is preferably 51.0 kJ/$m^3$ or more.

In addition, a method for producing an iron-chromium-cobalt alloy magnet according to a second invention of the present application include forming the iron-chromium-cobalt alloy magnet by an additive manufacturing method.

In the second invention, an energy density of a heat source irradiated during additive manufacturing is 35 J/$mm^3$ or more.

Advantageous Effects of Invention

According to the present invention, it is possible to provide an iron-chromium-cobalt alloy magnet that can improve magnetic characteristics, particularly a maximum energy product, and a method for producing the same.

BRIEF DESCRIPTION OF DRAWINGS (a) of FIG. 1 is an image acquired when a defect rate is measured in Example 1 and (b) of FIG. 1 is a schematic view of (a) of FIG. 1.

Figure 2:
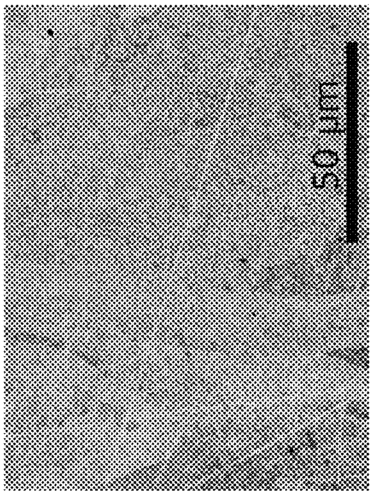
Figure 2:
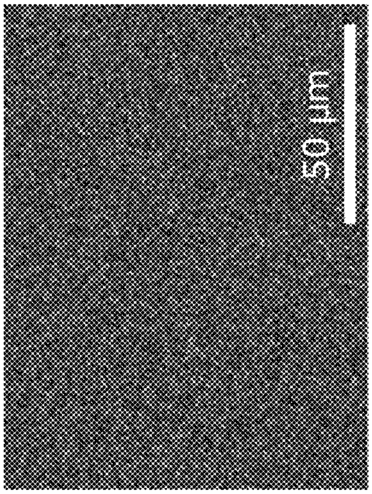
Figure 2:
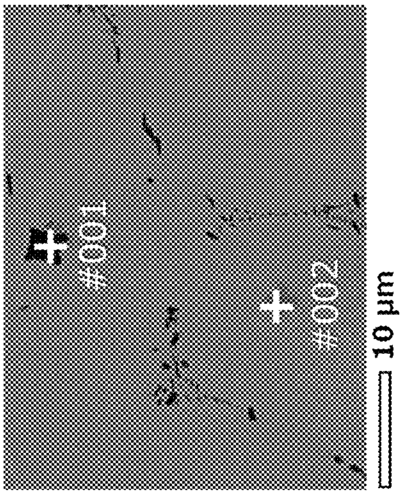
Figure 2:
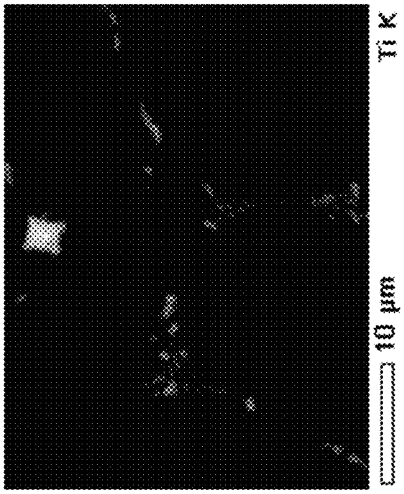

FIG. 2 shows SEM images of a built magnet obtained in Example 1 and a cast magnet obtained in Comparative Example 1, and EDS surface analysis images showing Ti distribution.

The present invention provides a magnet alloy that can restrict formation of a coarse precipitate at grain boundaries in a structure that is composed of a parent phase and a method for producing the same. The principle of additive manufacturing method is based on a molding principle in which a raw material powder is irradiated with a high-energy-density heat source such as a laser or an electron beam and melted at a high speed and solidified rapidly. According to the present invention, it is possible to provide an iron-chromium-cobalt alloy magnet in which, when a built component is directly produced from an iron-chromium-cobalt alloy powder by additive manufacturing method without performing a melting/casting process, formation of a coarse precipitate at grain boundaries in a structure that constitutes a base phase is restricted, and thus magnetic characteristics are improved, and a method for producing the same. As a result, when the additive manufacturing method is used as an alloy magnet production method, not only can a near net shape close to a desired part shape be formed, but it can also contribute to reduction of cracking or chipping caused by the coarse precipitate in the final finishing processing and thus an effect of improving the yield of the magnet product is also expected.

Hereinafter, embodiments of the present invention will be described. Regarding the alloy magnet production method in examples, a method using a powder bed type is exemplified as a representative example of the additive manufacturing methods, and a directed energy deposition method or the like may be used, and the alloy magnet production method of the present invention is not limited to the following embodiments.

[Raw Material Powder]

An iron-chromium-cobalt alloy magnet of the present invention preferably has a composition containing, in mass ratio, 17 to 45% of Cr, 3 to 35% of Co, and 0.1 to 0.6% of Ti, with the remainder being made up of Fe and unavoidable impurities obtained by adding at least Ti to an iron-chromium-cobalt alloy magnet containing, in mass ratio, 17 to 45% of Cr, and 3 to 35% of Co, with the remainder being made up of Fe and unavoidable impurities. In addition, elements other than Ti can be contained in combination. For example, Ti and Si may be added in combination to form a composition containing, in mass ratio, 17 to 45% of Cr, 3 to 35% of Co, 0.1 to 0.6% of Ti, and 0.1 to 0.6% of Si, with the remainder being made up of Fe and unavoidable impurities. The raw materials obtained by weighing and mixing the provided materials of each element are filled into a crucible and melted at a high frequency and the molten alloy is dropped from a nozzle at the bottom of the crucible, and sprayed with high-pressure argon to produce gas atomized powder, to obtain manufactured components of the desired composition. This gas atomized powder is classified to obtain an iron-chromium-cobalt alloy powder. This is used as a raw material powder.

[Built Component]

Using a 3D additive manufacturing machine of powder bed type, the raw material powder provided on the base plate is melted at rapidly and solidified rapidly by laser irradiation to produce built components, which is separated from the base plate. The obtained built components are the iron-chromium-cobalt alloy magnet of the present invention. Manufacturing conditions are appropriately determined in consideration of the particle size and composition of the raw material powder, size, shape and characteristics of the built component, production efficiency and the like, and regarding the alloy magnet of the present invention, conditions can be selected from the following ranges. The thickness of each powder layer in additive manufacturing is preferably 20 to 80 μm. The laser beam diameter is preferably about 0.1 mm at a position of the raw material powder on which irradiation is performed. The laser output is preferably 200 to 400 W. The laser scanning speed is preferably 500 to 2,500 mm/s. The laser scanning pitch is preferably 0.05 to 0.15 mm. The density of energy (energy density of the heat source: J/$mm^3$) input by laser irradiation to melt the raw material powder at a high speed is preferably 35 or more, more preferably in a range of 35 or more and 130 or less, still more preferably in a range of 50 or more and 110 or less, and yet more preferably in a range of more than 60 and 95 or less. If the energy density is too low, magnetic characteristics, particularly a squareness ratio, will decrease, and the defect rate will increase, which makes it difficult to put the magnet to practical use as iron-chromium-cobalt alloy magnets. If the energy density is too high, the raw material powder melts over a wide area around the laser irradiation position, and it becomes difficult to maintain the shape of the built components. The energy density E (J/$mm^3$) is determined from Formula (1) using a laser output P (W), a laser scanning speed v (mm/s), a laser scanning pitch a (mm), and the thickness d (mm) of each powder layer.

[Math. 1]

$$E = P/(v \times a \times d) \quad (1)$$

[Heat Treatment]

After building, the built components are subjected to a solution heat treatment, a heat treatment in a magnetic field, and an aging treatment. Specifically, in the solution heat treatment, the structure is transformed to an α phase at 700 to 1,000° C. for 1 to 1.5 hours, the heat treatment in the magnetic field is performed in a magnetic field of 150 to 300 kA/m at 600 to 700° C. for 1 to 5 hours, and in the aging treatment, the structure is phase-separated into an $\alpha_1$ ferromagnetic phase and an $\alpha_2$ paramagnetic phase at 600 to 700° C. for 0.5 to 3 hours. Then, cooling is performed at about 2 to 8° C./min.

According to the above production method, it is possible to produce an iron-chromium-cobalt alloy magnet according to a first invention of the present application, which contains titanium, and in which the number density of Ti-enriched phases having a maximum diameter of 3 μm or more in a cross section is, on average, less than 1.0 per 10,000 $\mu m^2$, and the squareness ratio represented by $(BH)_{max}/(B_r \times H_{cB})$ is more than 0.72. A fine and uniform structure in which the number density of Ti-enriched phases having a maximum diameter of 3 μm or more is, on average, less than 1.0 per 10,000 $\mu m^2$ contributes to improving magnetic characteristics such as the residual magnetic flux density $B_r$ and the maximum energy product $(BH)_{max}$ of the iron-chromium-cobalt alloy magnet. A high squareness ratio of more than 0.72 contributes to increasing $(BH)_{max}$. The reason why the iron-chromium-cobalt alloy magnet according to the present invention has finer and more uniform structure than an iron-chromium-cobalt alloy magnet produced by conventional casting can be thought to be that, when an alloy powder having a predetermined particle size or less is used, and rapid heating and cooling is performed, grain growth of Ti-enriched phases is inhibited and a finely dispersed structure is obtained.

In the present invention, the squareness ratio is a value obtained by $(BH)_{max}/(B_r \times H_{cB})$. Generally, for $H_k$, which is a parameter measured for obtaining $H_k/H_{cJ}$, in the second quadrant of J (the strength of the magnetization)-H (the strength of the magnetic field) curve, a read value on the H axis at a position at which J has a value of $0.9 \times J_r$ ($J_r$ is the residual magnetization, $J_r = B_r$) is used. The value $(H_k/H_{cJ})$ obtained by dividing this $H_k$ by $H_{cJ}$ of the demagnetization curve is defined as the squareness ratio. However, the iron-chromium-cobalt-based magnet alloy does not have the concept of the J-H curve, this is because, $H_k$ value of itis lower than that of Nd—Fe—B magnets and ferrite magnets, and $H_{cJ}$ and $H_{cB}$ are almost same as those in Nd—Fe—B magnets and ferrite magnets, and thus the squareness ratio defined as $(BH)_{max}/(B_r \times H_{cB})$ is more suitable as an index indicating squareness.

EXAMPLES

Example 1

Raw materials obtained by weighing and mixing predetermined amounts of element supply materials so that a built component with a desired composition was obtained were filled into a crucible, and melted at a high frequency in a vacuum, and the molten alloy was dropped from a nozzle with a diameter of 5 mm below the crucible, and sprayed with high-pressure argon to produce a gas atomized powder. This gas atomized powder was classified to obtain a 10 to 60 μm iron-chromium-cobalt alloy powder. This was used as a raw material powder.

Using a 3D additive manufacturing machine of powder bed type (EOS-M290 commercially available from EOS), the raw material powder supplied on an S45C base plate was melted rapidly and rapidly solidified by laser irradiation to produce a built component with a width of 10 mm, a length of 10 mm, and a lamination height of 10 mm, in terms of sizes after the processing margin was removed. Manufacturing conditions were as follows.

thickness of each powder layer/40 μm
laser beam diameter/about 0.1 mm
laser output/200 W
laser scanning speed/800 mm/s
laser scanning pitch/0.09 mm
energy density/69.4 $J/mm^3$ As the heat treatment of the built component, first, the solution heat treatment was performed at 900° C. for 1.3 hours, and then at 260 kA/m, at 620° C. for 2.5 hours in a magnetic field, and the aging treatment was additionally performed at 650° C. for 1.2 hours. Then, cooling was performed at about 5° C./min. Through such a heat treatment, an iron-chromium-cobalt alloy magnet (additive manufactured magnet) was obtained.

[Defect Rate]

After cutting and polishing at the center of the width of the built component after the heat treatment, the vicinity of the center of the cut surface was observed with a microscope (optical microscope) to measure the defect rate of precipitates. Specifically, first, using a 500× lens of a microscope, a predetermined range with the center of the field of view near the center of the cut surface was divided into 9 areas (3×3), and images captured in respective areas were acquired as one image. The acquired image is shown in (a) of FIG. 1. Dot-like areas with dark luminance in the image were voids (defects). (b) of FIG. 1 is a diagram schematically showing (a) of FIG. 1 in order to facilitate understanding of voids. The ratio of the area of the area with dark luminance to the area of the entire 9 images was defined as the defect rate and the defect rate was calculated to be 0.01%. Table 1 shows the defect rate together with the manufacturing conditions.

[Magnetic Characteristics]

Magnetic characteristics of the built component were evaluated using a B-H tracer. A B-H curve of each built component was obtained, and according to the B-H curve, the residual magnetic flux density $B_r$ was 1.39 [T], the coercive force $H_{cB}$ was 48.7 [kA/m], the maximum energy product $(BH)_{max}$ was 54.4 [$kJ/m^3$], and the squareness ratio was 0.80. The magnetic characteristics were significantly superior to those of cast magnets. Here, in order to evaluate magnetic characteristics, a test piece used for defect rate image analysis was used. Table 1 shows magnetic characteristics.

[Elemental Analysis]

Elemental analysis of the built component was performed using energy-dispersive X-ray spectroscopy (EDS) bundled in a scanning electron microscope (SEM). The test piece used for analysis was produced by cutting a part of the built component into small pieces, embedding them into a resin, and then polishing and finishing the cut surface of the embedded built component into a mirror surface. The analysis was performed using a scanning electron microscope with an acceleration voltage of 15 kV, an operation distance of 10 mm from the objective lens to the observation surface, and an observation magnification of 1,000. Ten elements, Al, C, Co, Cr, Fe, Mn, N, O, Si, and Ti, were analyzed. Table 2 shows the elemental analysis results.

[SEM Image and EDS Surface Analysis Image (Ti)]

Using the scanning electron microscope, an SEM image of the built component (additive manufactured magnet) obtained in Example 1 and an EDS surface analysis image showing Ti distribution were acquired in the same field of view. The used test piece was produced by cutting a part of the built component into small pieces, embedding them into a resin, and then polishing and finishing the cut surface of the embedded built component into a mirror surface. The analysis was performed using a scanning electron microscope with an acceleration voltage of 10 kV, an operation distance of 10 mm from the objective lens to the observation surface, and an observation magnification of 1,000.

FIG. 2 shows the acquired SEM images and EDS surface analysis images. From the SEM image, a columnar structure that is often seen in a 3D additive manufactured component formed by high-speed melting and rapidly solidifying a metal raw material powder by laser irradiation was observed. From the EDS surface analysis image, it was confirmed that Ti was finely and uniformly present (dispersed) throughout the structure. Next, the number of Ti-enriched phases having a maximum diameter of 3 μm or more in a cross section was measured. As a result, Ti-enriched phases having a maximum diameter of 3 μm or more were not confirmed by measurement at three locations in a 90 μm×120 μm (an area of 10,800 $\mu m^2$) field of view, and the number density of Ti-enriched phases was, on average, 0.0 per 10,000 $\mu m^2$. Since enriched phases containing hard and brittle Ti and having a maximum diameter of 3 μm or more were not formed, Ti was finely and uniformly present (dispersed) in crystal grains, and the defect rate was low, in addition to obtaining magnetic characteristics that were significantly superior to those of cast magnets, cracking or chipping during processing was reduced, and an improvement in yield was expected.

Example 2

A built component formed of an iron-chromium-cobalt alloy was produced by an additive manufacturing method (laminate-molding method) in the same manner as in Example 1 except that the laser output was 350 W, the laser scanning speed was 1,750 mm/s, the scanning pitch was 0.11 mm, and the energy density was 45.5 $J/mm^3$, and heated to obtain an additive manufactured magnet (iron-chromium-cobalt alloy magnet) formed of an iron-chromium-cobalt-based hard magnetic material. As in Example 1, for this additive manufactured magnet, the defect rate was measured, magnetic characteristics were evaluated, and elemental analysis and SEM image and EDS surface analysis image acquisition were performed. The defect rate was 0.45%, which was expected to satisfy the level at which cracking or chipping during processing could be reduced.

Regarding magnetic characteristics, the residual magnetic flux density was 1.37 [T], the coercive force was 47.8 [kA/m], the maximum energy product was 51.3 [$kJ/m^3$], and the squareness ratio was 0.78. The magnetic characteristics were significantly superior to those of cast magnets. From the acquired SEM image, it was confirmed that the metal structure was the same as that of the alloy magnet of Example 1. From the EDS surface analysis image, it was confirmed that Ti was finely and uniformly present (dispersed) throughout the structure.

Next, the number of Ti-enriched phases having a maximum diameter of 3 μm or more in a cross section was measured. As a result, Ti-enriched phases having a maximum diameter of 3 μm or more were not confirmed by measurement at three locations in a 90 μm×120 μm (an area of 10,800 $\mu m^2$) field of view, and the number density of Ti-enriched phases was, on average, 0.0 per 10,000 $\mu m^2$. Since enriched phases containing hard and brittle Ti and having a maximum diameter of 3 μm or more were not formed, Ti was finely and uniformly present (dispersed) in crystal grains, and the defect rate was low, in addition to obtaining magnetic characteristics that were significantly superior to those of cast magnets, cracking or chipping during processing was reduced, and an improvement in yield was expected.

Example 3

A built component formed of an iron-chromium-cobalt alloy was produced by an additive manufacturing method in the same manner as in Example 1 except that the laser output was 350 W, the laser scanning speed was 2,000 mm/s, the scanning pitch was 0.11 mm, and the energy density was 39.8 $J/mm^3$, and heated to obtain an additive manufactured magnet (iron-chromium-cobalt alloy magnet) formed of an iron-chromium-cobalt-based hard magnetic material.

As in Example 1, for this additive manufactured magnet, the defect rate was measured, magnetic characteristics were evaluated, and elemental analysis and SEM image and EDS surface analysis image acquisition were performed. The defect rate was 0.82%. Regarding magnetic characteristics, the residual magnetic flux density was 1.35 [T], the coercive force was 47.6 [kA/m], the maximum energy product was 50.0 [$kJ/m^3$], and the squareness ratio was 0.78. The magnetic characteristics were significantly superior to those of cast magnets. From the acquired SEM image, it was confirmed that the metal structure was the same as that of Example 1. From the EDS surface analysis image, it was confirmed that Ti was finely and uniformly present (dispersed) throughout the structure.

Next, the number of Ti-enriched phases having a maximum diameter of 3 μm or more in a cross section was measured. As a result, Ti-enriched phases having a maximum diameter of 3 μm or more were not confirmed by measurement at three locations in a 90 μm×120 μm (an area of 10,800 $\mu m^2$) field of view, and the number density of Ti-enriched phases was, on average, 0.0 per 10,000 $\mu m^2$. Since Ti-containing enriched phases having a maximum diameter of 3 μm or more were not formed, Ti was finely and uniformly present (dispersed) in crystal grains, and the defect rate was low, in addition to obtaining magnetic characteristics that were significantly superior to those of cast magnets, cracking or chipping during processing was reduced, and an improvement in yield was expected.

Example 4

A built component formed of an iron-chromium-cobalt alloy was produced by an additive manufacturing method in the same manner as in Example 1 except that the laser output was 350 W, the laser scanning speed was 800 mm/s, the scanning pitch was 0.11 mm, and the energy density was 99.4 $J/mm^3$, and heated to obtain an additive manufactured magnet (iron-chromium-cobalt alloy magnet) formed of an iron-chromium-cobalt-based hard magnetic material.

As in Example 1, for this additive manufactured magnet, the defect rate was measured, magnetic characteristics were evaluated, and elemental analysis and SEM image and EDS surface analysis image acquisition were performed. The defect rate was 0.02%, which was able to sufficiently satisfy the level at which cracking or chipping during processing could be reduced. Regarding magnetic characteristics, the residual magnetic flux density was 1.40 [T], the coercive force was 48.5 [kA/m], the maximum energy product was 54.1 [$kJ/m^3$], and the squareness ratio was 0.80. The magnetic characteristics were significantly superior to those of cast magnets. From the acquired SEM image, it was confirmed that the metal structure was the same as that of Example 1. From the EDS surface analysis image, it was confirmed that Ti was finely and uniformly present (dispersed) throughout the structure.

Next, the number of Ti-enriched phases having a maximum diameter of 3 μm or more in a cross section was measured. As a result, Ti-enriched phases having a maximum diameter of 3 μm or more were not confirmed by measurement at three locations in a 90 μm×120 μm (an area of 10,800 $\mu m^2$) field of view, and the number density of Ti-enriched phases was, on average, 0.0 per 10,000 $\mu m^2$. Since enriched phases containing hard and brittle Ti and having a maximum diameter of 3 μm or more were not formed, Ti was finely and uniformly present (dispersed) in crystal grains, and the defect rate was low, in addition to obtaining magnetic characteristics that were significantly superior to those of cast magnets, cracking or chipping during processing was reduced, and an improvement in yield was expected.

Comparative Example 1

In this comparative example, a hard magnetic material (iron-chromium-cobalt alloy magnet) formed of an iron-chromium-cobalt alloy was produced by casting. Specifically, the raw material powder produced in the same manner as in Example 1 was melted in a melting furnace and then poured into a sand mold for production. After cooling, the hard magnetic material was removed from the sand mold, and since it was necessary to remove sprue parts and remove burrs, rough processing was performed for that purpose. Then, the same heat treatment (a solution heat treatment, a heat treatment in a magnetic field, and an aging treatment) as in Example 1 was performed to obtain a cast magnet (iron-chromium-cobalt alloy magnet) formed of an iron-chromium-cobalt-based hard magnetic material.

In the same manner as in Example 1, for this cast magnet, the defect rate was measured, magnetic characteristics were evaluated, and elemental analysis and SEM image and EDS surface analysis image acquisition were performed. The hard magnetic material produced by casting had a defect rate of 0.66%, and there was a risk of the level at which cracking or chipping during processing could be reduced not being sufficiently satisfied. In addition, regarding magnetic characteristics, the residual magnetic flux density was 1.35 [T], the coercive force was 49.5 [kA/m], the maximum energy product was 47.8 [$kJ/m^3$], and the squareness ratio was 0.72. The magnetic characteristics did not necessarily sufficiently satisfy the level of practical use as iron-chromium-cobalt permanent magnets.

FIG. 2 shows the acquired SEM images and EDS surface analysis images. From the SEM image, precipitates were observed in spots at grain boundaries, and precipitates having a maximum diameter of about 5 μm and a shape close to a square were observed in the metal structure. From the EDS surface analysis image, it was confirmed that these precipitates were Ti-enriched phases formed by uneven Ti distribution. Since C and N were also detected in Ti-enriched phases, it was confirmed that Ti-enriched phases mainly contained titanium in the form of titanium carbides such as TiC and titanium nitrides such as TiN.

Next, the number of Ti-enriched phases having a maximum diameter of 3 μm or more in a cross section was measured from the EDS surface analysis image. As a result, four Ti-enriched phases having a maximum diameter of 3 μm or more were confirmed in measurement at three locations in a 90 μm×120 μm (an area of 10,800 $\mu m^2$) field of view, and the number density of Ti-enriched phases was, on average, 1.23 per 10,000 $\mu m^2$. The Ti concentration in the metal structure including Ti-enriched phases in the entire field of view was 1.07 mass %, the Ti concentration in the center (#001) of the Ti-enriched phase was 87.88 mass %, and the Ti concentration in the center (#002) of the parent phase other than the Ti-enriched phase was 0.14 mass %. The reason why the Ti concentration in the raw material was 0.55 mass %, but the Ti concentration in the metal structure of the entire field of view was as high as 1.07% was thought to be due to non-uniform presence of Ti-enriched phases.

In the case of an iron-chromium-cobalt-based hard magnetic material (iron-chromium-cobalt alloy magnet) having a metal structure in which such Ti-enriched phases having a large maximum diameter were present, since cracking or chipping starting from defects was likely to occur during processing, an improvement in yield was not expected when casting was used to produce magnet products.

Comparative Example 2

A built component formed of an iron-chromium-cobalt alloy was produced by an additive manufacturing method (laminate-molding method) in the same manner as in Example 1 except that the laser output was 250 W, the laser scanning speed was 1,750 mm/s, the scanning pitch was 0.11 mm, and the energy density was 32.5 $J/mm^3$, heated to obtain an additive manufactured magnet (iron-chromium-cobalt alloy magnet) formed of an iron-chromium-cobalt-based hard magnetic material. As in Example 1, for this additive manufactured magnet, the defect rate was measured, magnetic characteristics were evaluated, and elemental analysis and SEM image and EDS surface analysis image acquisition were performed. The defect rate was 1.93%, and there was a risk of the level at which cracking or chipping during processing could be reduced not being sufficiently satisfied.

In addition, regarding magnetic characteristics, the residual magnetic flux density was 1.25 [T], the coercive force was 47.4 [kA/m], the maximum energy product was 39.5 [$kJ/m^3$], and the squareness ratio was 0.67. These magnetic characteristics were not necessarily sufficient for practical use as an iron-chromium-cobalt alloy magnet. From the acquired SEM image, it was confirmed that the metal structure was the same as that of Example 1 except for the defect rate. From the EDS surface analysis image, it was confirmed that Ti was finely and uniformly present (dispersed) throughout the structure. Next, the number of Ti-enriched phases having a maximum diameter of 3 μm or more in a cross section was measured. As a result, Ti-enriched phases having a maximum diameter of 3 μm or more were not confirmed by measurement at three locations in a 90 μm×120 μm (an area of 10,800 $\mu m^2$) field of view, and the number density of Ti-enriched phases was, on average, 0.0 per 10,000 $\mu m^2$.

TABLE 1

| | Laser output [W] | Scanning speed [mm/s] | Scanning pitch [mm] | Energy density [J/mm$^3$] | Defect rate [%] | Residual magnetic flux density [T] | Coercive force [kA/m] | Maximum energy product [kJ/m$^3$] | Square ratio | Note |
|---|---|---|---|---|---|---|---|---|---|---|
| Example 1 | 200 | 800 | 0.09 | 69.4 | 0.01 | 1.39 | 48.7 | 54.4 | 0.80 | |
| Example 2 | 350 | 1,750 | 0.11 | 45.5 | 0.45 | 1.37 | 47.8 | 51.3 | 0.78 | |
| Example 3 | 350 | 2,000 | 0.11 | 39.8 | 0.82 | 1.35 | 47.6 | 50.0 | 0.78 | |
| Example 4 | 350 | 800 | 0.11 | 99.4 | 0.02 | 1.40 | 48.5 | 54.1 | 0.80 | |
| Comparative Example 1 | — | — | — | — | 0.66 | 1.35 | 49.5 | 47.8 | 0.72 | cast magnet |
| Comparative Example 2 | 250 | 1,750 | 0.11 | 32.5 | 1.93 | 1.25 | 47.4 | 39.5 | 0.67 | |

TABLE 2

| | Al | C | Co | Cr | Fe | Mn | N | O | Si | Ti | Note |
|---|---|---|---|---|---|---|---|---|---|---|---|
| Example 1 | 0.16 | 0.22 | 10.02 | 25.84 | 62.47 | 0.03 | 0.00 | 0.31 | 0.48 | 0.48 | |
| Example 2 | 0.17 | 0.18 | 9.85 | 25.80 | 62.58 | 0.09 | 0.00 | 0.34 | 0.45 | 0.54 | |
| Example 3 | 0.18 | 0.17 | 9.85 | 25.83 | 62.67 | 0.02 | 0.00 | 0.31 | 0.44 | 0.54 | |
| Example 4 | 0.14 | 0.15 | 9.88 | 25.96 | 62.42 | 0.19 | 0.00 | 0.29 | 0.45 | 0.53 | |
| Comparative Example 1 | 0.24 | 0.18 | 9.73 | 25.90 | 62.05 | 0.22 | 0.00 | 0.08 | 0.52 | 1.07 | entire field of view |
| | 0.17 | 4.13 | 0.49 | 2.99 | 3.49 | 0.00 | 0.77 | 0.03 | 0.04 | 87.88 | precipitate |
| | 0.21 | 0.11 | 9.79 | 25.99 | 62.88 | 0.35 | 0.00 | 0.01 | 0.53 | 0.14 | parent phase other than precipitate |
| Comparative Example 2 | 0.18 | 0.18 | 9.89 | 25.75 | 62.57 | 0.09 | 0.00 | 0.38 | 0.46 | 0.50 | |

What is claimed is:

1. An iron-chromium-cobalt alloy magnet, which contains titanium, wherein a number density of Ti-enriched phases having a maximum diameter of 3 μm or more in a cross section is, on average, less than 1.0 per 10,000 μm$^2$, a squareness ratio represented by $(BH)_{max}/(B_r \times H_{cB})$ is more than 0.72, and a content of titanium is 0.10 to 0.60% in terms of mass ratio.

2. The iron-chromium-cobalt alloy magnet according to claim 1, wherein a defect rate in a cross section is 0.50% or less.

3. The iron-chromium-cobalt alloy magnet according to claim 2, wherein the defect rate is 0.05% or less.

4. The iron-chromium-cobalt alloy magnet according to claim 1, wherein the squareness ratio is 0.80 or more.

5. The iron-chromium-cobalt alloy magnet according to claim 1, wherein a maximum energy product is 51.0 kJ/m$^3$ or more.

6. A method for producing an iron-chromium-cobalt alloy magnet, comprising:

forming the iron-chromium-cobalt alloy magnet according to claim 1 by an additive manufacturing method.

7. The method for producing an iron-chromium-cobalt alloy magnet according to claim 6, wherein an energy density of a heat source irradiated in the additive manufacturing method is 35 J/mm$^3$ or more.

* * * * *